(12) United States Patent
Kuehl et al.

(10) Patent No.: US 9,790,303 B2
(45) Date of Patent: Oct. 17, 2017

(54) PROCESS FOR CONTROLLING AN ETHYLENE POLYMERIZATION PROCESS

(71) Applicant: Basell Polyolefine GmbH, Wesseling (DE)

(72) Inventors: Reinhard Kuehl, Bornheim (DE); Rodrigo Carvajal, Bonn (DE); Gerhardus Meier, Frankfurt (DE); Elke Damm, Bad Vilbel (DE); Phil Pyman, Bad Soden (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/321,637

(22) PCT Filed: Jun. 22, 2015

(86) PCT No.: PCT/EP2015/063990
§ 371 (c)(1),
(2) Date: Dec. 22, 2016

(87) PCT Pub. No.: WO2015/197558
PCT Pub. Date: Dec. 30, 2015

(65) Prior Publication Data
US 2017/0210833 A1    Jul. 27, 2017

(30) Foreign Application Priority Data

Jun. 25, 2014  (EP) .................................... 14173893

(51) Int. Cl.
*C08F 210/06* (2006.01)
*C08F 2/14* (2006.01)
(Continued)

(52) U.S. Cl.
CPC ........ *C08F 210/16* (2013.01); *C08F 2400/02* (2013.01)

(58) Field of Classification Search
CPC ................................ C08F 2/14; C08F 210/16
(Continued)

(56) References Cited

U.S. PATENT DOCUMENTS

| 2005/0267267 A1 | 12/2005 | Sandell et al. |
| 2011/0034635 A1* | 2/2011 | Kapur ..................... C08F 10/00 525/240 |
| 2011/0152472 A1 | 6/2011 | Gessner et al. |

FOREIGN PATENT DOCUMENTS

| EP | 2336200 A1 | 6/2011 |
| WO | WO 2005/040226 A2 | 5/2005 |

OTHER PUBLICATIONS

PCT International Search Report & Written Opinion dated Sep. 11, 2015 for PCT/EP2015/063990.

* cited by examiner

Primary Examiner — Fred M Teskin

(57) ABSTRACT

A method for controlling a slurry polymerization for the preparation of polyethylene, where the polyethylene is formed in a polymerization reactor comprising a vapor section by contacting a Ziegler-type catalyst, ethylene, and either hydrogen or, as comonomer(s), one or more $C_3$ to $C_{10}$ alpha-olefins or hydrogen and one or more $C_3$ to $C_{10}$ alpha-olefins, wherein the ethylene partial pressure is maintained by adjusting the flow rate of the catalyst to the polymerization reactor and the hydrogen/ethylene and comonomer/ethylene partial pressure ratios are maintained by adjusting the flow rates of hydrogen and/or of the one or more comonomers to the polymerization reactor.

20 Claims, 2 Drawing Sheets

(51) Int. Cl.
*C08F 210/16* (2006.01)
*C08F 4/642* (2006.01)
*C08F 4/68* (2006.01)

(58) Field of Classification Search
USPC .......................................................... 526/61
See application file for complete search history.

PROCESS FOR CONTROLLING AN ETHYLENE POLYMERIZATION PROCESS

FIELD OF THE INVENTION

The present disclosure relates to methods for controlling ethylene polymerization processes. More particularly, the present disclosure relates to processes for controlling ethylene slurry polymerization processes using gas-phase analysis of the reactor vapor. The present disclosure further relates to processes for the preparation of polyethylene in a slurry polymerizations.

BACKGROUND OF THE INVENTION

Various processes can be used to produce polyethylene, including gas phase processes, solution processes, and slurry processes. In ethylene slurry polymerization processes, diluents such as hexane or isobutane may be used to dissolve the ethylene monomer, comonomers and hydrogen, and the monomer(s) are polymerized with a catalyst. Following polymerization, the polymer product formed is present as a slurry of polyethylene particles suspended in the liquid medium.

In exemplary multi-reactor cascade processes, shown e.g., in WIPO Pat. App. Pub. No. WO 2005/077992 A1 or WIPO Pat. App. Pub. No. WO 2012/028591 A1, the reactors can be operated in parallel or in series, and the types and amounts of monomer and conditions can be varied in each reactor to produce a variety of polyethylene materials, including unimodal or multimodal polyethylene material. Such multimodal compositions are used in a variety of applications; e.g., WIPO Pat. App. Pub. No. WO 2012/069400 A1 discloses trimodal polyethylene compositions for blow moldings.

In processes to produce polyethylene, feeding comonomers and hydrogen along with ethylene as main monomer may allow to adapt the properties of the resulting ethylene polymer to the required values. Adding comonomer may reduce the density of the polyethylene and may impact the polymer's stiffness, toughness and stress crack resistance. Adding hydrogen may reduce the molecular weight and may impact the polymer's processability. In multi-reactor processes with different polymerization conditions in each reactor, an even more targeted adaption of the polymer properties may be possible. In multi-reactor processes, comonomer and hydrogen may be red to the polymerization reactor along with the ethylene; alternatively hydrogen and ethylene without comonomer may be fed to multi-reactor processes; alternatively still comonomer and ethylene without hydrogen may be fed to multi-reactor processes.

Various approaches have been used to control continuous manufacturing processes in polymerization plants. European Pat. App. No. EP 0 318 609 A1 discloses a process for producing propylene copolymers where the fraction of gas-phase produced copolymer is controlled. European Pat. App. No. EP 2 336 200 A1 discloses a process to manufacture an olefin polymer in suspension in a series of two polymerization reactors.

Disclosed herein are methods for controlling a slurry polymerization for the preparation of polyethylene. In particular disclosed herein are methods for the operation of the reactors in series to produce bimodal or multimodal polyethylene, with control of each reactor to provide a control of the polymer properties of the final powder.

SUMMARY OF THE INVENTION

The present disclosure provides methods for controlling a slurry polymerization of ethylene to produce polyethylene. The disclosure provides methods for controlling a slurry polymerization for the preparation of polyethylene. The polyethylene may be formed in a polymerization reactor (having as slurry, a suspension of particulate polyethylene in a suspension medium comprising a diluent) by contacting a Ziegler-type catalyst, ethylene, and either hydrogen or, as comonomer(s), one or more $C_3$ to $C_{10}$ alpha-olefins or hydrogen and one or more $C_3$ to $C_{10}$ alpha-olefins. The reactor temperature may be from 60° C. to 95° C. and the reactor pressure may be from 0.15 MPa to 3 MPa, The diluent, ethylene, the Ziegler-type catalyst, and either hydrogen or one or more $C_3$ to $C_{10}$ alpha-olefins or hydrogen and one or more $C_3$ to $C_{10}$ alpha-olefins may be fed to the polymerization reactor and the slurry may be withdrawn from the polymerization reactor.

The polymerization reactor may have a reactor slurry section comprising the slurry and a reactor vapor section comprising a vapor. The vapor may comprise ethylene, diluent, and either hydrogen or one or more $C_3$ to $C_{10}$ alpha-olefins or hydrogen and one or more $C_3$ to $C_{10}$ alpha-olefins. The method may include:

a) withdrawing vapor from the reactor vapor section;
b) analyzing the vapor to determine its composition; and
c) calculating thereof, based on the pressure within the polymerization reactor, values for the partial pressure of ethylene, for the partial pressure ratio of hydrogen to ethylene and for the partial pressure ratios of the one or more comonomers to ethylene;
d) maintaining the flow rate of the ethylene to the polymerization reactor at a constant level;
e) adjusting the flow rate of the Ziegler-type catalyst to the polymerization reactor to maintain the ethylene partial pressure at a targeted ethylene partial pressure; and either adjusting the flow rate of hydrogen to the polymerization reactor to maintain the hydrogen/ethylene partial pressure ratio at a targeted hydrogen/ethylene partial pressure ratio;
or adjusting the flow rates of the one or more comonomers to the polymerization reactor to maintain the comonomer/ethylene partial pressure ratios at targeted comonomer/ethylene partial pressure ratios;
or adjusting both the flow rate of hydrogen to the polymerization reactor to maintain the hydrogen/ethylene partial pressure ratio at a targeted hydrogen/ethylene partial pressure ratio and adjusting the flow rates of the one or more comonomers to the polymerization reactor to maintain the comonomer/ethylene partial pressure ratios at targeted comonomer/ethylene partial pressure ratios.

In some embodiments, hydrogen is fed to the polymerization reactor and the flow rate of hydrogen to the polymerization reactor is adjusted to maintain the hydrogen/ethylene partial pressure ratio at a targeted hydrogen/ethylene partial pressure ratio.

In some embodiments, one or more comonomers are fed to the polymerization reactor and the flow rates of the comonomers to the polymerization reactor are adjusted to maintain the comonomer/ethylene partial pressure ratios at targeted comonomer/ethylene partial pressure ratios.

In some embodiments, the comonomers are selected from the group consisting of 1-butene, 1-pentene, 1-hexene, 1-octene or mixtures thereof.

In some embodiments, the methods additionally comprise:

g) maintaining the flow rate of the diluent to the polymerization reactor at a constant level.

In some embodiments, the diluent is hexane or isobutane.

In some embodiments the vapor withdrawn from the reactor vapor section is conditioned by being cooled to a temperature of 10° C. or below before being analyzed.

In some embodiments the cooling occurs by a heat exchanger located above the polymerization reactor and the liquid, which is obtained by partial condensing of the vapor during cooling, returns to the polymerization reactor by means of gravity.

In some embodiments, the present disclosure provides methods for controlling a slurry polymerization for the preparation of polyethylene which is carried out in a series of polymerization reactors having a first polymerization reactor and one or more subsequent polymerization reactors, where the polyethylene is formed in polymerization reactors comprising, as slurry, a suspension of particulate polyethylene in a suspension medium comprising a diluent by contacting a Ziegler-type catalyst, ethylene, and either hydrogen or, as comonomer(s), one or more $C_3$ to $C_{10}$ alpha-olefins or hydrogen and one or more $C_3$ to $C_{10}$ alpha-olefins at a reactor temperatures from 60° C. to 95° C. and a reactor pressures from 0.15 MPa to 3 MPa, where the Ziegler-type catalyst is fed to the first polymerization reactor and a diluent, ethylene, and either hydrogen or one or more $C_3$ to $C_{10}$ alpha-olefins or hydrogen and one or more $C_3$ to $C_{10}$ alpha-olefins are fed to each of the polymerization reactors and slurry is withdrawn from each of the polymerization reactor, and
where the polymerization reactor each have a reactor slurry section comprising the slurry and a reactor vapor section comprising a vapor comprising ethylene, diluent, and either hydrogen or one or more $C_3$ to $C_{10}$ alpha-olefins or hydrogen and one or more $C_3$ to $C_{10}$ alpha-olefins, the method comprising:
a) withdrawing vapor from the reactor vapor section of the first polymerization reactor;
b) analyzing the vapor to determine its composition; and
c) calculating thereof, based on the pressure within the first polymerization reactor, values for the partial pressure of ethylene, for the partial pressure ratio of hydrogen to ethylene and for the partial pressure ratios of the one or more comonomers to ethylene;
d) maintaining the flow rate of the ethylene to the first polymerization reactor at a constant level;
e) adjusting the flow rate of the Ziegler-type catalyst to the first polymerization reactor to maintain the ethylene partial pressure at a targeted ethylene partial pressure;
f) either adjusting the flow rate of hydrogen to the first polymerization reactor to maintain the hydrogen/ethylene partial pressure ratio at a targeted hydrogen/ethylene partial pressure ratio;
or adjusting the flow rates of the one or more comonomers to the first polymerization reactor to maintain the comonomer/ethylene partial pressure ratios at targeted comonomer/ethylene partial pressure ratios;
or adjusting both the flow rate of hydrogen to the first polymerization reactor to maintain the hydrogen/ethylene partial pressure ratio at a targeted hydrogen/ethylene partial pressure ratio and adjusting the flow rates of the one or more comonomers to the first polymerization reactor to maintain the comonomer/ethylene partial pressure ratios at targeted comonomer/ethylene partial pressure ratios;
h) withdrawing vapor from the reactor vapor section of the one or more subsequent polymerization reactors,
i) analyzing the vapor to determine its composition; and
j) calculating thereof, based on the pressure within the subsequent polymerization reactor, values for the partial pressure of ethylene, for the partial pressure ratio of hydrogen to ethylene and for the partial pressure ratios of the one or more comonomers to ethylene;
k) maintaining the flow rate of the ethylene to the one or more subsequent polymerization reactors at a constant level; and
l) either adjusting the flow rate of hydrogen to the one or more subsequent polymerization reactors to maintain the hydrogen/ethylene partial pressure ratio at a targeted hydrogen/ethylene partial pressure ratio;
or adjusting the flow rates of the one or more comonomers to the one or more subsequent polymerization reactors to maintain the comonomer/ethylene partial pressure ratios at targeted comonomer/ethylene partial pressure ratios;
or adjusting both the flow rate of hydrogen to the one or more subsequent polymerization reactors to maintain the hydrogen/ethylene partial pressure ratio at a targeted hydrogen/ethylene partial pressure ratio and adjusting the flow rates of the one or more comonomers to the one or more subsequent polymerization reactors to maintain the comonomer/ethylene partial pressure ratios at targeted comonomer/ethylene partial pressure ratios.

In some embodiments, the methods additionally comprises:
m) maintaining the flow rates of the diluent to the one or more subsequent polymerization reactors at a constant level.

In some embodiments, the series of polymerization reactors have two polymerization reactors.

In some embodiments, the series of polymerization reactors have three polymerization reactors.

In some embodiments, hydrogen is fed to a previous polymerization reactor; the slurry withdrawn from the previous polymerization reactor is subjected to a flashing step in a flashing vessel before being fed to the subsequent reactor; and the flow rate of hydrogen to the subsequent polymerization reactor is adjusted to maintain the hydrogen/ethylene partial pressure ratio at a targeted hydrogen/ethylene partial pressure ratio by adjusting the pressure in the flashing vessel.

In some embodiments, the present disclosure provides processes for the preparation of polyethylene in a slurry polymerization by contacting, in a suspension medium comprising a diluent, ethylene, a Ziegler-type catalyst and either hydrogen or, as comonomer(s), one or more $C_3$ to $C_{10}$ alpha-olefins or hydrogen and one or more $C_3$ to $C_{10}$ alpha-olefins at a reactor temperature from 60° C. to 95° C. and a reactor pressure from 0.15 MPa to 3 MPa.

In some embodiments, the polymerization is carried out in a series of polymerization reactors.

DETAILED DESCRIPTION OF THE INVENTION

Figure 1A:
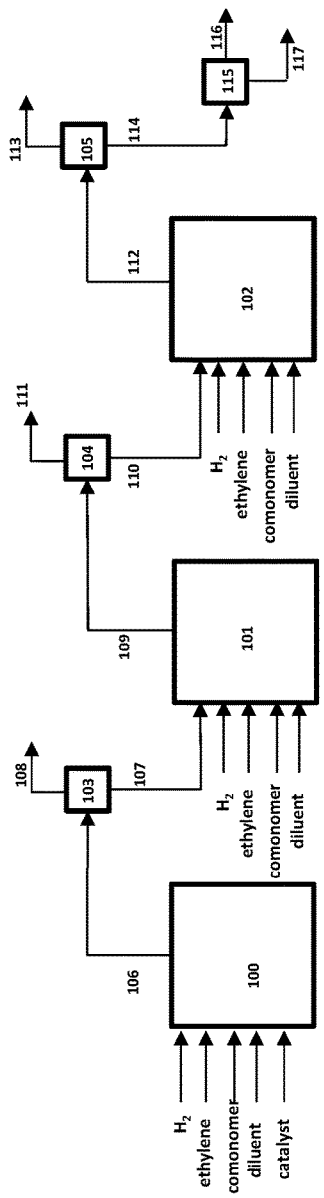
FIG. 1a is a flow diagram of an ethylene slurry polymerization process having multiple reactors operated in series, i.e. in cascade mode.

Applicants presently believe that more efficient control of ethylene slurry polymerization processes can result from obtaining a vapor sample from the polymerization reactor, analyzing the sample to determine its compositional makeup and then controlling the composition of the components in the polymerization reactor by adjusting, based on the gas sample analysis, the feed rate of the Ziegler-type catalyst and the feed rates of hydrogen and comonomers and maintaining the feed rates of ethylene.

The process of the present disclosure to produce polyethylene includes the slurry polymerization of ethylene and optionally one or more comonomers in the presence of a Ziegler-type catalyst, a diluent, such as hexane or isobutane, and optionally hydrogen. The polymerization proceeds in a suspension of particulate polyethylene in a suspension medium comprising the diluent, unreacted ethylene and optionally one or more comonomers. Polyethylene polymers obtained by the process described in the present disclosure can be ethylene homopolymers or copolymers of ethylene containing up to 40 wt. %, or from 0.1 to 10 wt. % of recurring units derived from $C_3$-$C_{10}$-1-alkenes. The comonomers may be chosen from propylene, 1-butene, 1-pentene, 1-hexene, 1-octene or mixtures thereof. The slurry polymerization may occur at reactor temperatures from 60° C. to 95° C., or from 65° C. to 90° C., or from 70° C. to 85° C., and at reactor pressures from 0.15 MPa to 3 MPa, or from 0.2 MPa to 2 MPa, or from 0.25 MPa to 1.5 MPa.

The polyethylene polymers produced by the polymerization process may be high density polyethylene resins having a density in the range from 0.935 g/cm$^3$ to 0.970 g/cm$^3$. Alternatively, the density is in the range from 0.940 g/cm$^3$ to 0.970 g/cm$^3$, or the density is in the range from 0.945 g/cm$^3$ to 0.965 g/cm$^3$. Density may be measured according to DIN EN ISO 1183-1:2004, Method A (Immersion) with compression molded plaques of 2 mm thickness which were prepared with a defined thermal history: Pressed at 180° C., 20 MPa for 8 min with subsequent crystallization in boiling water for 30 min.

The polyethylene polymers produced by the polymerization process may have a melt index ($MI_{21.6}$) from 1 dg/min to 300 dg/min, or from 1.5 dg/min to 50 dg/min, or from 2 dg/min to 35 dg/min. The $MI_{21.6}$ may be measured according to DIN EN ISO 1133:2005, condition G at a temperature of 190° C. under a load of 21.6 kg.

Catalyst

The polymerization may be carried out using Ziegler-type catalysts, i.e. catalysts of the Ziegler type which are at times also designated as Ziegler-Natta catalysts, comprising a compound of titanium or vanadium, a compound of magnesium and optionally a particulate inorganic oxide as support.

The titanium compounds may be selected from the halides or alkoxides of trivalent or tetravalent titanium, with titanium alkoxy halogen compounds or mixtures of various titanium compounds. Examples of titanium compounds are $TiBr_3$, $TiBr_4$, $TiCl_3$, $TiCl_4$, $Ti(OCH_3)Cl_3$, $Ti(OC_2H_5)Cl_3$, $Ti(O-i-C_3H_7)Cl_3$, $Ti(O-n-C_4H_9)Cl_3$, $Ti(OC_2H_5)Br_3$, $Ti(O-n-C_4H_9)Br_3$, $Ti(OCH_3)_2Cl_2$, $Ti(OC_2H_5)_2Cl_2$, $Ti(O-n-C_4H_9)_2Cl_2$, $Ti(OC_2H_5)_2Br_2$, $Ti(OCH_3)_3Cl$, $Ti(OC_2H_5)_3Cl$, $Ti(O-n-C_4H_9)_3Cl$, $Ti(OC_2H_5)_3Br$, $Ti(OCH_3)_4$, $Ti(OC_2H_5)_4$ or $Ti(O-n-C_4H_9)_4$. In an embodiment of the present disclosure, the titanium compounds may comprise chlorine as the halogen. In an embodiment, the titanium halides may comprise only halogen in addition to titanium or may be titanium chlorides or may be titanium tetrachloride. The vanadium compounds may be vanadium halides, vanadium oxyhalides, vanadium alkoxides or vanadium acetylacetonates. In an embodiment, the vanadium compounds are in the oxidation states 3 to 5.

In the production of the solid component, at least one compound of magnesium may be used. These compounds may be halogen-comprising magnesium compounds such as magnesium halides, and in particular the chlorides or bromides, or these compounds may be magnesium compounds from which the magnesium halides can be obtained in a customary way, e.g., by reaction with halogenating agents. In an embodiment of the preset disclosure, the, the halogens are chlorine, bromine, iodine or fluorine, or mixtures of two or more of the halogens.

Possible halogen-containing magnesium compounds may include magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. The halogenating agents may be, for example, halogens, hydrogen halides, $SiCl_4$ or $CCl_4$. In one embodiment, chlorine or hydrogen chloride is the halogenating agents.

Examples of halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxy ethoxy magnesium, n-butyloxy-sec-butyloxy magnesium, n-butyloxyoctyloxy-magnesium and diphenoxymagnesium. In one embodiment, the halogen-free compounds of magnesium are n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

The magnesium compounds for producing the particulate solids may be, apart from magnesium dichloride or magnesium dibromide, the di($C_1$-$C_{10}$-alkyl)magnesium compounds. In one embodiment, the Ziegler-type catalyst comprises a transition metal selected from titanium, zirconium, vanadium, and chromium.

The Ziegler-type catalyst may be added to the slurry reactor by first mixing the catalyst with the diluent used, such as hexane, in a mixing tank to form a slurry, which may be pumped. A positive displacement pump, such as a membrane pump may be used to transfer the catalyst slurry to the slurry polymerization reactor.

Cocatalyst

Catalysts of the Ziegler type may be used for polymerization in the presence of a cocatalyst. Accordingly, the slurry polymerization of the present disclosure may be carried out in the presence of a cocatalyst. In various embodiments, cocatalysts are organometallic compounds of metals of groups 1, 2, 12, 13 or 14 of the Periodic Table of Elements, or organometallic compounds of metals of group 13 or organoaluminum compounds. The organoaluminum compounds may be selected from aluminum alkyls. The aluminum alkyls may be selected from trialkylaluminum compounds or from trimethylaluminum (TMA), triethylaluminum (TEAL), tri-isobutylaluminum (TIBAL), or tri-n-hexylaluminum (TNHAL). The cocatalyst(s) may be miscible with the diluent and thus comprised in the suspension medium.

The cocatalyst can be added to the slurry reactor as such. In an embodiment, the cocatalyst is added by first mixing the cocatalyst with the diluent used, such as hexane or isobutane, in a mixing tank. A positive displacement pump, such as a membrane pump may be used to transfer the cocatalyst to the slurry polymerization reactor.

The polyethylene slurry production process may be carried out in at least one polymerization reactor. It may include a polymerization in a stand-alone polymerization reactor or it may include a polymerization in a polymerization reactor of a multi-reactor system. Such multi-reactor systems may be operated in parallel or in series. It is possible to operate two, three or more polymerization reactors in parallel. In an embodiment, the polymerization reactors of the multi-reactor system are operated in series; i.e. the reactors are arranged as cascade. Such series of polymerization reactors have a first polymerization reactor and one, two or more subsequent polymerization reactors. In an alternative embodiment, the polyethylene slurry production process is carried out in a series of three polymerization reactors.

The slurry polymerization may occur in the polymerization reactor by contacting the Ziegler-type catalyst, optionally in combination with the cocatalyst, ethylene, and either hydrogen or, as comonomer(s), one or more $C_3$ to $C_{10}$ alpha-olefins or hydrogen and one or more $C_3$ to $C_{10}$ alpha-olefins. Polyethylene may form around the catalyst particles as a result of the polymerization reactions, so that the catalyst becomes part of the polymer itself. The resulting slurry may be a suspension of particulate polyethylene in a liquid suspension medium.

When operated in series, diluent, the catalyst system, i.e., the Ziegler-type catalyst and the optional cocatalyst, ethylene, and either hydrogen or one or more $C_3$ to $C_{10}$ alpha-olefins or hydrogen and one or more $C_3$ to $C_{10}$ alpha-olefins may be fed to the first polymerization reactor. The catalyst may remain active within the polyethylene particles when the slurry is withdrawn from the first polymerization reactor polymer and fed to the subsequent reactor of the series of polymerization reactors. The slurry fed to the subsequent polymerization reactor may contain particulate polyethylene and may also contain diluent, non-reacted ethylene and, when fed, non-reacted comonomer(s) and hydrogen. In an embodiment, no additional catalyst and/or cocatalyst are fed to the subsequent reactor or to the subsequent reactors. Instead, catalyst and cocatalyst used in the previous reactor may flow with the slurry to the subsequent reactors. This sequence can be repeated up to the total number of reactors in use. For the final polymerization reactor in the series, the slurry produced may be fed to a separation system where the liquid is separated from the polymer. The liquid, composed primarily of diluent, may be recycled back to the reactors. The polymer may be then dried, mixed with additives and compounded. Comonomer(s) may be fed to all the polymerization reactors, to none or to some of the polymerization reactors in any combination. In an embodiment, no comonomer is fed to the first polymerization reactor so that an ethylene homopolymer is produced. Comonomer(s) along with ethylene may be fed to the subsequent polymerization reactors. By varying the types of ethylene polymers produced in each polymerization reactor, a wide range of properties in the final polymer can be obtained.

When operated in parallel mode, catalyst, optional cocatalyst, diluent, and either hydrogen or one or more $C_3$ to $C_{10}$ alpha-olefins or hydrogen and one or more $C_3$ to $C_{10}$ alpha-olefins may be fed to each of the polymerization reactors. The resultant product slurries may be fed to a separation device where the liquid is separated from the polymer. The liquid, composed primarily of diluent, may be recycled back to the polymerization reactors. The polyethylene may be then dried, mixed with additives and compounded.

The polymerization reactors may include cylindrical walls, bottom and top reactor heads, and an agitator for mixing the contents of the internal reactor volume. During operation, the reactor may also include a reactor slurry section and a reactor vapor section. The reactor slurry section may be that volume of the reactor that contains the suspension of the particulate polyethylene in the suspension medium, and extends from the bottom head of the reactor to the level of slurry in the reactor. The reactor vapor section may be that portion of the reactor extending from above the liquid level in the reactor up to the top head. The vapor in the reactor vapor section may be substantially in equilibrium with the suspension medium in the reactor slurry section at the operating temperature and pressure.

The method of controlling according to the present disclosure can be carried out in any polymerization reactors for the preparation of polyethylene in slurry having a reactor vapor section, to which polymerization reactors Ziegler-type catalysts are fed. Such polymerization reactors may be stand-alone polymerization reactors; such polymerization reactors may be all reactors of a multi-reactor system operated in parallel; or such polymerization reactors may be the first reactors of multi-reactor systems operated in series. For operating multi-reactor systems in series, the method of controlling according to the present disclosure may include further steps for additionally controlling also the polymerization in subsequent polymerization reactors to which no fresh Ziegler-type catalysts are fed but solely slurry having polyethylene particles comprising still active catalysts.

Reactor Control

By determining the concentration of components in the reactor vapor, Applicants believe it is possible to estimate the concentration of components in the suspension medium. A method encompassed by the present disclosure comprises, as step a), that vapor is withdrawn from the reactor vapor section. Therefore, a sample point for taking a reactor vapor sample is provided on the reactor or the reactor head.

In step b) if the embodiment, the vapor is analyzed to determine its composition. Therefore the reactor vapor sample is routed from the reactor to an analyzer for measurement of the vapor components. The composition of the vapor may be determined according to established methods. It is possible to determine the composition in one measurement. In an embodiment, different measurements, possibly according to different methods, may be carried out for examining the different components of the vapor.

Based on the determined composition of the vapor and the pressure within the polymerization reactor, values for the partial pressure of ethylene, for the partial pressure ratio of hydrogen to ethylene and for the partial pressure ratios of the one or more comonomers to ethylene may be calculated in step c).

According to an embodiment of the present disclosure, the vapor withdrawn from the reactor vapor section is conditioned by being first cooled to a temperature of 10° C. or below, or to a temperature in the range from 0° C. to 10° C. before being analyzed. By cooling the reactor vapor to a temperature of 10° C. or below, a part of the vapor, which is mainly diluent like hexane, condenses and the analysis of the vapor can be carried out on a cooled vapor having a lower content of diluent. Thus, condensation of diluent on the line to the analyzer, which could result in erroneous results, may be avoided and the analyses of the vapor may be done under same conditions, i.e. at the same temperature. The amount of diluent in the vapor withdrawn from the reactor vapor section reactor may be prior to cooling 50 wt. % to 80% wt. %, based on the weight of the reactor vapor sample. The amount of diluent in the conditioned reactor vapor may be 0 wt. % to 10 wt. %, or 5 wt. % to 10 wt. %, based on the weight of the reactor vapor sample.

In an embodiment, the cooling of the reactor vapor is carried out in the vicinity of the polymerization reactor from which it was withdrawn, in a way that the condensed components of the vapor can be returned to the polymerization reactor. Accordingly, the cooling may occur by means of a heat exchanger located above the polymerization reactor and the liquid, which is obtained by partial condensing of the vapor during cooling, returns to the polymerization reactor by means of gravity. The heat exchanger may be cooled using chilled hexane.

The method of controlling according to the present disclosure may be configured in a way that, as step d), the flow rate of the ethylene to the polymerization reactor is maintaining at a constant level. The ethylene flow rate to the polymerization reactor may be targeted to be constant; however the amount of ethylene fed per time to an individual polymerization reactor may be different for different slurry polymerizations producing different polyethylene grades or may even be different for different polymerizations producing the same polyethylene grades if these different polymerizations producing the same polyethylene grades differ in the targeted production rate (because Applicants believe that the flow rate of ethylene to an individual polymerization reactor determines the production rate of for this polymerization reactor). The ethylene feed rate to a polymerization reactor may correspond to the polyethylene production rate in this reactor.

In the ethylene slurry polymerization reactors to which Ziegler-type catalyst is fed, the measurement of the ethylene partial pressure in the conditioned reactor vapor may be used to adjust the catalyst injection rate. As the catalyst injection rate is increased, there may be a corresponding increase in ethylene polymerization rate, with a related decrease in ethylene concentration and accordingly a decrease in the ethylene partial pressure. The opposite may occur when the catalyst injection rate is decreased. Accordingly, in step e), the flow rate of the Ziegler-type catalyst to the polymerization reactor may be adjusted to maintain the ethylene partial pressure at a targeted ethylene partial pressure.

To adapt the properties of the produced polyethylene to the needs of the specific application, hydrogen or one or more $C_3$ to $C_{10}$ alpha olefins as comonomer(s) or both hydrogen and one or more $C_3$ to $C_{10}$ alpha olefins may be fed to the polymerization reactors. To ensure that the targeted property combination is maintained, a control of the hydrogen/ethylene partial pressure ratio and the comonomer/ethylene partial pressure ratios may be required. Consequently, a further method of the present disclosure comprises, as step f), that either the flow rate of hydrogen to the polymerization reactor is adjusted to maintain the hydrogen/ethylene partial pressure ratio at a targeted hydrogen/ethylene partial pressure ratio; or the flow rates of the one or more comonomers to the polymerization reactor is adjusted to maintain the comonomer/ethylene partial pressure ratios at targeted comonomer/ethylene partial pressure ratios; or both the flow rate of hydrogen and the flow rates of the one or more comonomers to the polymerization reactor are adjusted to maintain the hydrogen/ethylene partial pressure ratio at a targeted hydrogen/ethylene partial pressure ratio and to maintain the comonomer/ethylene partial pressure ratios at targeted comonomer/ethylene partial pressure ratios.

In an embodiment of the present disclosure, the method includes as step g) that the flow rate of the diluent to the polymerization reactor is maintained at a constant level.

The method of the present disclosure may be carried out in series, i.e. in cascades of polymerization reactors. In such embodiments, the methods may comprise further steps h) to l) for additionally controlling also the polymerizations in subsequent polymerization reactors to which no fresh Ziegler-type catalyst is fed. These additional steps can be carried out in some or in all of the subsequent polymerization reactors. In an embodiment, these further steps h) to l) are carried out in all of the subsequent polymerization reactors. The method for controlling the polymerization in subsequent polymerization reactors is similar to the method for controlling the polymerization in subsequent polymerization reactors, to which Ziegler-type catalyst is fed, but does not include a step that a flow rate of a Ziegler-type catalyst the polymerization reactor is adjusted. Accordingly, steps h), i) and j) are identical to steps a), b) and c); step k) is identical to step d); and step l) is identical to step f).

The measurement of the comonomer and ethylene partial pressures in the conditioned reactor vapor and the corresponding calculation of the comonomer/ethylene ratios may be used to adjust the comonomer feed rates to each reactor. The amount of comonomer in the produced polymer influences its properties, so that targeting a particular comonomer/ethylene ratio may produce a polyethylene having particular properties. In this way, Applicants believe by targeting a comonomer/ethylene ratio, as the ethylene flow rate changes, for example as a result of a change in the targeted polyethylene production rate, the comonomer flow rate will also automatically change.

It is possible that the desirable polyethylene product will require a combination of ethylene polymers components having different comonomer content. In these embodiments, the polymerizations in the different polymerization reactors may be carried out with different targeted comonomer/ethylene ratio. Moreover, it is possible that the desired combination of polymers components can require ethylene polymer component(s) with no comonomer at all. In these embodiments, the targeted comonomer/ethylene ratio in the respective polymerization reactor would be zero. In an embodiment, no comonomer is fed to the first reactor so that an ethylene homopolymer is produced, while comonomer is fed to subsequent reactors to produce ethylene comonomers.

The measurement of the hydrogen and ethylene partial pressures in the reactor vapor and the corresponding calculation of the hydrogen/ethylene ratios may be used to adjust the hydrogen feed rates to each reactor. The level of hydrogen in the reactors may influence the amount of hydrogen transfer reactions that occur, which in turn may determine the molecular weight, melt index and molecular weight distribution of the ethylene polymer produced. In this way, by targeting a hydrogen/ethylene ratio, as the ethylene flow rate changes, the hydrogen flow rate may also automatically change.

In the first reactor, a control valve on the hydrogen flow may be adjusted to maintain the targeted hydrogen/ethylene ratio. In subsequent reactors, the ratio can also be maintained by subjecting the slurry withdrawn from the previous polymerization reactor to a flashing step in a flashing vessel such as a flash drum before being fed to the subsequent reactor and adjusting the position of a valve on the flashing vessel that controls the pressure in the flashing vessel. This valve may control the amount of hydrogen transferred from the previous to the subsequent polymerization reactor. When both control valves are used to control the hydrogen/ethylene ratio, the control valve on the hydrogen flow can be configured to open as the valve on the flashing vessel becomes closed (so as to prevent a conflict in the control loops).

In an embodiment of the present disclosure, the method includes as step m) that the flow rates of the diluent to the polymerization reactor are maintained at a constant level.

Figure 1B:
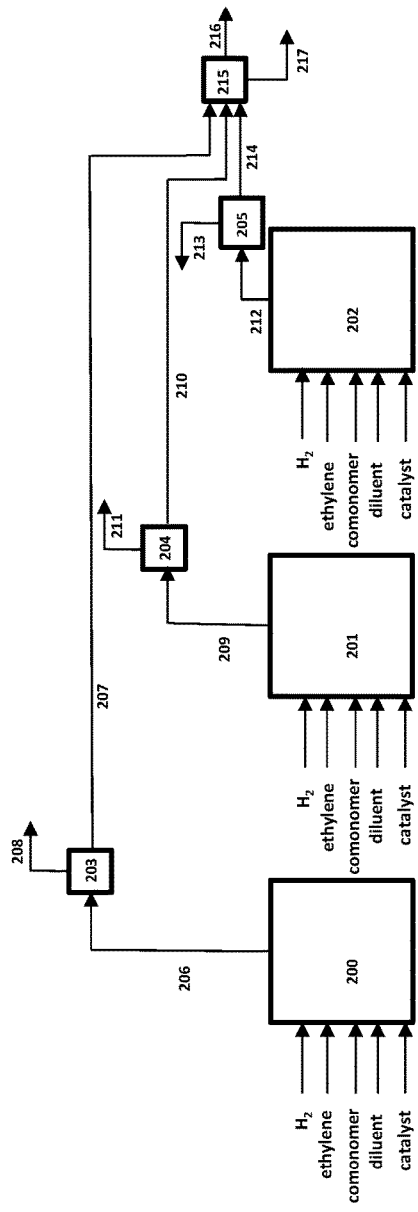
FIG. 1b is a flow diagram of an ethylene slurry polymerization process having multiple reactors operated in parallel mode.

FIGS. 1a and 1b illustrate an embodiment of an ethylene slurry polymerization process where the ethylene slurry polymerization reactors are operated in series and in parallel, respectively. FIG. 1a illustrates an ethylene slurry polymerization process where the reactors are operated in series, i.e. in a cascade. Monomers, i.e. ethylene and comonomers, diluent, catalyst and hydrogen are fed to slurry polymerization reactor 100. Product from reactor 100 flows to flash drum 103 through line 106. Gas flows out of flash drum 103 through line 108. Slurry flows out of flash drum 103 through line 107 to reactor 101. Additional monomers, i.e. ethylene or ethylene and comonomers, and hydrogen are fed to reactor 101. Product from reactor 101 flows to flash drum 104 through line 109. Gas flows out of the flash drum 104 through line 111. Slurry flows out of flash drum 104 through line 110 to reactor 102. Additional monomers, i.e. ethylene or ethylene and comonomers, and hydrogen are fed to reactor 102. Product from reactor 102 flows to flash drum 105 through line 112. Gas flows out of flash drum 105 through line 113. Slurry flows out of flash drum 105 through line 114 to separation system 115, which separates diluent stream 116 from polymer stream 117. Diluent stream 116 can be either recycled to the reactors directly or processed to remove waxes and low boiling impurities, and then recycled. Polymer stream 117 may further be dried and then compounded with additives.

FIG. 1b illustrates an ethylene slurry polymerization process where the reactors are operated in parallel. Hydrogen, monomers, i.e. ethylene and comonomers, diluent and catalyst are separately fed to slurry polymerization reactors 200, 201 and 202. Product from reactors 200, 201 and 202 exit the reactors through lines 206, 209, and 212, respectively, and are routed to respective flash drums 203, 204 and 205. Gas flows out of flash drums 203, 204, and 205 through respective lines 208, 211 and 213. Slurry exits respective flash drums 203, 204, and 205 through lines 207, 210, and 214 respectively, and are routed to separation system 215, which separates diluent stream 216 from polymer stream 217. Diluent stream 216 may be recycled to the reactors directly or processed to remove waxes and low boiling impurities, and then recycled. Polymer stream 217 may be further dried and then compounded with additives.

Figure 2:
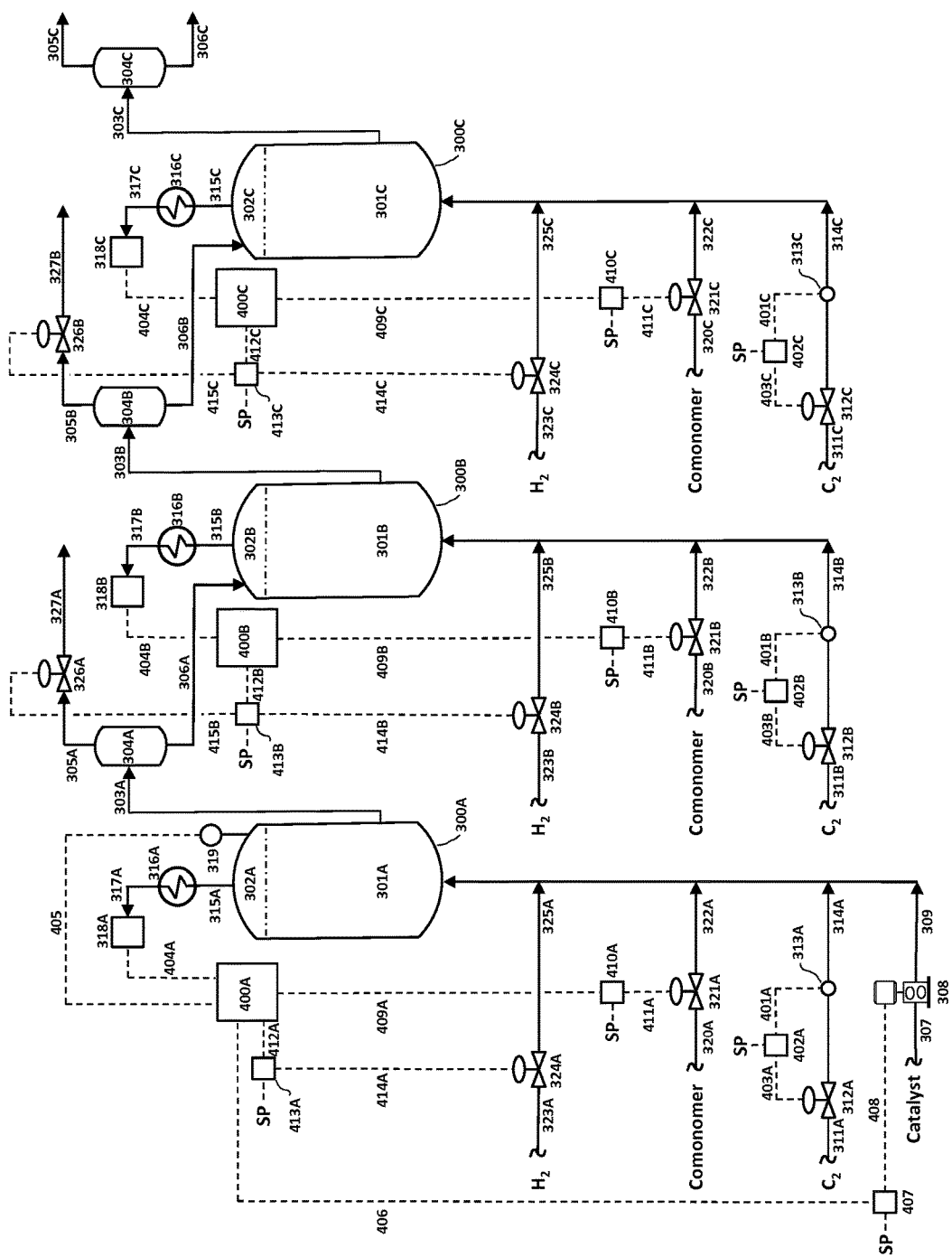
FIG. 2 is a flow diagram of an ethylene slurry polymerization process having multiple reactors operated in series illustrating control loops for operating the polymerization process.

FIG. 2 illustrates a control scheme for ethylene slurry polymerization reactors 300A, 300B, and 300C, operating in series (cascade). Each of reactors 300A, 300B, and 300C has a respective reactor slurry section 301A, 301B, and 301C and a respective reactor vapor section 302A, 302B, and 302C. For the purposes of the FIG. 2, unless otherwise indicated, the suffixes "A", "B", and "C", appending the same three-digit number refer to identical elements associated with different reactors.

Slurry exits the reactors 300A, 300B, and 300C through lines 303A, 303B, and 303C and flows to flash drum 304A, 304B, and 304C. Vapor exits flash drum 304A, 304B, and 304C through lines 305A, 305B, and 305C. Slurry from flash drum 304A flows to reactor 300B via line 306A. Slurry from flash drum 304B flows to reactor 300C via line 306B. Slurry from flash drum 304C is routed through line 306C for further treatment to separate the liquid suspension medium from polymer particles.

The Ziegler-type catalyst for the slurry polymerization in reactors 300A, 300B, and 300C is delivered through line 307, catalyst pump 308, and line 309 to reactor 300A. The polymerization in reactors 300B and 300C occurs with the catalyst which is transferred with the slurry, mainly comprised within the polyethylene particles, from reactor 300A to reactor 300B and then from reactor 300B to reactor 300C. No additional catalyst is fed to reactors 300B and 300C.

Ethylene Feed Control

Ethylene feed control may be configured to target constant ethylene flow rates to the ethylene slurry polymerization reactors. The amount of ethylene fed per time to an individual polymerization reactor may be different for different slurry polymerizations, which may produce different polyethylene grades. Alternatively, the amount of ethylene fed per time to an individual polymerization reactor may be different for different polymerizations producing the same polyethylene grades (for example, if these different polymerizations producing the same polyethylene grades differ in the targeted production rate because the flow rate of ethylene to an individual polymerization reactor determines the production rate of for this polymerization reactor). Ethylene for reactors 300A, 300B, and 300C is delivered through lines 311A, 311B, and 311C to control valves 312A, 312B, and 312C. Flow meters 313A, 313B, and 313C produce flow signals 401A, 401B, and 401C, which are representative of the flow rate of ethylene in lines 314A, 314B, and 314C. Flow controllers 402A, 402B, and 402C receive flow signals 401A, 401B, and 401C, and setpoints (SP) which are representative of desired flow rates for ethylene flowing in lines 314A, 314B, and 314C. Flow controllers 402A, 402B, and 402C provide output signals 403A, 403B, and 403C which are responsive of the difference between signals 401A, 401B, and 401C and the setpoints for the respective ethylene flows. Control valves 312A, 312B, and 312C are manipulated in response to signals 403A, 403B, and 403C to adjust the ethylene flows in lines 314A, 314B, and 314C to the desired flow rates for ethylene.

One skilled in the art would recognize that the controllers could use any of established algorithms employed, such as proportional, proportional-integral, proportional-derivative, or proportional-integral-derivative.

For controlling the slurry polymerization, reactor vapor is withdrawn from reactor vapor sections 302A, 302B, and 302C and fed, via lines 315A, 315B, and 315C, to heat exchangers 316A, 316B, and 316C in which the reactor vapor is conditioned by being cooled to a temperature of from 3° C. to 10° C. using chilled hexane. A part of the reactor vapor, mainly diluent, condenses and the obtained liquid flows back down into the reactor through lines 315A, 315B, and 315C. The conditioned reactor vapor is then fed via lines 317A, 317B, and 317C to analysis transducers 318A, 318B, and 318C which are adapted to determine the composition of the conditioned reactor vapor and to deliver signals 404A, 404B, and 404C, representative of the vapor composition, to calculators 400A, 400B, and 400C. Calculators 400A, 400B, and 400C calculate, based on signals 404A, 404B, and 404C, the ratios for the partial pressures of hydrogen and ethylene and of comonomer and ethylene in the reactor vapor sections 302A, 302B, and 302C. When provided with information about the absolute pressure in reactors 300A, 300B, and 300C (not shown for reactors 300B, and 300C) calculators 400A, 400B, and 400C are also able to calculate the absolute partial pressures of ethylene, hydrogen and comonomer in the reactor vapor sections 302A, 302B, and 302C.

Catalyst Feed Control

Catalyst feed to the reactor 300A is configured to maintain the ethylene partial pressure in the reactor vapor section 302A at a targeted level by adjusting the pumping rate of catalyst pump 308. Pressure transducer 319 produces a pressure signal 405 which is representative of the pressure of reactor 300A. Calculator 400A receives signal 405 and signals 404A representative of the composition of the conditioned reactor vapor, and produces a signal 406 which is representative of the ethylene partial pressure in the reactor vapor section 302A and thus the ethylene concentration in the slurry in reactor 300A. Controller 407 receives signal 406 along with a setpoint (SP) which is representative of the desired ethylene partial pressure in the reactor vapor section 302A. Controller 407 provides output signal 408 which is responsive of the difference between signal 406 and the setpoint for the ethylene partial pressure. Pump speed of catalyst pump 308 is regulated in response to signal 408 to control the catalyst flow through lines 309, to effect that the targeted ethylene partial pressure in the reactor vapor section 302A is maintained.

Comonomer Feed Control

Comonomer feed control is configured to target comonomer/ethylene partial pressure ratios in the reactor vapor sections 302A, 302B, and 302C by adjusting the comonomer flow rates to the reactors. Comonomer for reactors 300A, 300B, and 300C is delivered through lines 320A, 320B, and 320C to control valves 321A, 321B, and 321C. Smaller amounts of comonomer are further delivered to reactor 300B by slurry transferred from reactor 300A to reactor 300B if comonomer was fed to reactor 300A and to reactor 300C by slurry transferred from reactor 300B to reactor 300C if comonomer was fed to reactor 300B.

Calculators 400A, 400B, 400C receive signals 404A, 404B, and 404C representative of the composition of the conditioned reactor vapor, and produce signals 409A, 409B, and 409C which are representative of the comonomer/ethylene partial pressure ratios in the reactor vapor sections 302A, 302B, and 302C. Controllers 410A, 410B, and 410C receive signals 409A, 409B, and 409C along with setpoints (SP) which are representative of the desired comonomer/ethylene partial pressure ratios in the reactor vapor section 302A, 302B, and 302C. Controllers 410A, 410B, and 410C provide output signals 411A, 411B, and 411C which are responsive of the difference between signals 409A, 409B, and 409C and the setpoints for the comonomer/ethylene partial pressure ratios. Control valves 321A, 321B, and 321C are manipulated in response to signals 411A, 411B, and 411C to adjust the comonomer flows in lines 322A, 322B, and 322C, to effect that the targeted comonomer/ethylene partial pressure ratios in the reactor vapor section 302A, 302B, and 302C are maintained.

Hydrogen Feed Control

Hydrogen feed control is configured to target hydrogen/ethylene partial pressure ratios in the reactor vapor sections 302A, 302B, and 302C by adjusting the hydrogen flow rates to the reactors. Hydrogen for reactors 300A, 300B, and 300C is delivered through lines 323A, 323B, and 323C to control valves 324A, 324B, and 324C. Amounts of hydrogen comonomer are further delivered to reactor 300B by slurry transferred from reactor 300A to reactor 300B if hydrogen was fed to reactor 300A and to reactor 300C by slurry transferred from reactor 300B to reactor 300C if hydrogen was fed to reactor 300B.

Calculators 400A, 400B, 400C receive signals 404A, 404B, and 404C representative of the composition of the conditioned reactor vapor, and produce signals 412A, 412B, and 412C which are representative of the hydrogen/ethylene partial pressure ratios in the reactor vapor sections 302A, 302B, and 302C. Controllers 413A, 413B, and 413C receive signals 412A, 412B, and 412C along with setpoints (SP) which are representative of the desired hydrogen/ethylene partial pressure ratios in the reactor vapor section 302A, 302B, and 302C. Controllers 413A, 413B, and 413C provide output signals 414A, 414B, and 414C which are responsive of the difference between signals 412A, 412B, and 412C and the setpoints for the hydrogen/ethylene partial pressure ratios. Control valves 324A, 324B, and 324C are manipulated in response to signals 414A, 414B, and 414C to adjust the hydrogen flows in lines 325A, 325B, and 325C, to effect that the targeted hydrogen/ethylene partial pressure ratios in the reactor vapor section 302A, 302B, and 302C are maintained.

When polymerizing in reactors 300B and 300C with lower partial pressures of hydrogen than in the previous reactors 300A and 300B, it can occur that more hydrogen may be delivered to reactors 300B and 300C by transfer of slurry from reactors 300A and 300B than is needed to maintain the targeted hydrogen/ethylene partial pressure ratios in reactors 300B and 300C. For such polymerizations, little or no hydrogen is delivered through lines 323B and 323C and the hydrogen flow to reactors 300B and 300C is adjusted by removing hydrogen from the slurry transferred to reactors 300B and 300C. The amount of hydrogen fed to reactors 300B and 300C by slurry transfer via lines 306A and 306B is the lower the more gas is withdrawn from the slurry in flash drums 304A and 304B via lines 305A and 305B, that means the lower the pressure in flash drums 304A and 304B becomes. The pressure in flash drums 304A and 304B, and consequently also the amount of withdrawn hydrogen, can be regulated by control valves 326A and 326B to adjust the gas flow through lines 327A and 327B.

Accordingly, controllers 413B and 413C provides additional output signals 415B and 415C which are also responsive of the difference between signals 412B and 412C and the setpoints for the hydrogen/ethylene partial pressure ratios. Control valves 326A and 326B are manipulated in response to signals 415B and 415C to adjust the gas flows in lines 327A and 327B, to effect that the targeted hydrogen/ethylene partial pressure ratios in the reactor vapor section 302A, 302B, and 302C are maintained. Detailed configuration of control valves 326A and 326B and 324B and 324C is such that control valves 326A and 326B would open as control valves 324B and 324C close, i.e., when all hydrogen is delivered by transfer from reactor 300A to reactor 300B, or from reactor 300B to reactor 300C.

An embodiment of the control method of the present disclosure is illustrated in FIG. 2 by way of a slurry polymerization employing one comonomer. However, such a scheme may be possible with feeding as comonomer a mixture of alpha-olefins or that it is possible to implement one or more additional feeding units with additional control steps for polymerizing in the presence of two or more comonomer. Similarly, it may be possible that the ethylene slurry polymerization illustrated in FIG. 2 further includes feeding of diluent and of cocatalyst to all polymerization reactors and may beyond that also include feeding of additives such antistatics to the reactors (although this not shown in FIG. 2 for the sake of simplicity).

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

We claim:

1. A method for controlling a slurry polymerization for the preparation of polyethylene, comprising:
   contacting in a polymerization reactor a Ziegler-type catalyst, ethylene, and either hydrogen or, as comonomer(s), one or more $C_3$ to $C_{10}$ alpha-olefins or hydrogen and one or more $C_3$ to $C_{10}$ alpha-olefins at a reactor temperature from 60° C. to 95° C. and a reactor pressure from 0.15 MPa to 3 MPa; and
   forming the polyethylene in the polymerization reactor, wherein the polymerization reactor has, as a slurry, a suspension of particulate polyethylene in a suspension medium comprising a diluent,
   wherein the diluent, ethylene, the Ziegler-type catalyst, and either hydrogen or one or more $C_3$ to $C_{10}$ alpha-olefins or hydrogen and one or more $C_3$ to $C_{10}$ alpha-olefins are fed to the polymerization reactor and the slurry is withdrawn from the polymerization reactor, and wherein the polymerization reactor has a reactor slurry section comprising the slurry and a reactor vapor section comprising a vapor comprising ethylene, diluent, and either hydrogen or one or more $C_3$ to $C_{10}$ alpha-olefins or hydrogen and one or more $C_3$ to $C_{10}$ alpha-olefins, the method further comprising:
   a) withdrawing the vapor from the reactor vapor section;
   b) analyzing the vapor to determine its composition; and
   c) calculating thereof, based on the pressure within the polymerization reactor, values for the partial pressure of ethylene, for the partial pressure ratio of hydrogen to ethylene and for the partial pressure ratios of the one or more comonomers to ethylene;
   d) maintaining the flow rate of the ethylene to the polymerization reactor at a constant level;
   e) adjusting the flow rate of the Ziegler-type catalyst to the polymerization reactor to maintain the ethylene partial pressure at a targeted ethylene partial pressure; and
   f) either adjusting the flow rate of hydrogen to the polymerization reactor to maintain the hydrogen/ethylene partial pressure ratio at a targeted hydrogen/ethylene partial pressure ratio;
   or adjusting the flow rates of the one or more comonomers to the polymerization reactor to maintain the comonomer/ethylene partial pressure ratios at targeted comonomer/ethylene partial pressure ratios;
   or adjusting both the flow rate of hydrogen to the polymerization reactor to maintain the hydrogen/ethylene partial pressure ratio at a targeted hydrogen/ethylene partial pressure ratio and adjusting the flow rates of the one or more comonomers to the polymerization reactor to maintain the comonomer/ethylene partial pressure ratios at targeted comonomer/ethylene partial pressure ratios.

2. The method of claim 1, wherein hydrogen is fed to the polymerization reactor and the flow rate of hydrogen to the polymerization reactor is adjusted to maintain the hydrogen/ethylene partial pressure ratio at a targeted hydrogen/ethylene partial pressure ratio.

3. The process of claim 1, wherein one or more comonomers are fed to the polymerization reactor and the flow rates of the comonomers to the polymerization reactor are adjusted to maintain the comonomer/ethylene partial pressure ratios at targeted comonomer/ethylene partial pressure ratios.

4. The process of claim 3, wherein the comonomers are selected from the group consisting of 1-butene, 1-pentene, 1-hexene, 1-octene or mixtures thereof.

5. The method of claim 1, additionally comprising:
   g) maintaining the flow rate of the diluent to the polymerization reactor at a constant level.

6. The process of claim 1, wherein the diluent is hexane or isobutane.

7. The method of claim 1, wherein the vapor withdrawn from the reactor vapor section is conditioned by being cooled to a temperature of 10° C. or below before being analyzed.

8. The method of claim 7, wherein the cooling occurs by means of a heat exchanger located above the polymerization reactor and the liquid, which is obtained by partial condensing of the vapor during cooling, returns to the polymerization reactor by means of gravity.

9. The method of claim 1, wherein the slurry polymerization is carried out in a series of polymerization reactors having a first polymerization reactor and one or more subsequent polymerization reactors and the polymerization reactor of claim 1 is the first reactor of the series of polymerization reactors and suspension withdrawn from said first reactor is fed to a subsequent reactor, and additional polyethylene is formed in the one or more subsequent reactors at a reactor temperature from 60° C. to 95° C. and a reactor pressure from 0.15 MPa to 3 MPa,
   where additional diluent, ethylene, and either hydrogen or, as comonomer(s), one or more C3 to C10 alpha-olefins or hydrogen and one or more C3 to C10 alpha-olefins are fed to the one or more subsequent polymerization reactors and slurry is withdrawn from the one or more subsequent polymerization reactor, and
   where the one or more subsequent polymerization reactors have a reactor slurry section comprising the slurry and a reactor vapor section comprising a vapor comprising ethylene, diluent, and either hydrogen or one or more comonomers or hydrogen and one or more comonomers,
   the method for controlling the slurry polymerization comprising the additional steps of:
   h) withdrawing vapor from the reactor vapor section of the one or more subsequent polymerization reactors;
   i) analyzing the vapor to determine its composition; and
   j) calculating thereof, based on the pressure within the subsequent polymerization reactor, values for the partial pressure of ethylene, for the partial pressure ratio of hydrogen to ethylene and for the partial pressure ratios of the one or more comonomers to ethylene;
   k) maintaining the flow rate of the ethylene to the one or more subsequent polymerization reactors at a constant level; and
   l) either adjusting the flow rate of hydrogen to the one or more subsequent polymerization reactors to maintain the hydrogen/ethylene partial pressure ratio at a targeted hydrogen/ethylene partial pressure ratio;

or adjusting the flow rates of the one or more comonomers to the one or more subsequent polymerization reactors to maintain the comonomer/ethylene partial pressure ratios at targeted comonomer/ethylene partial pressure ratios;

or adjusting both the flow rate of hydrogen to the one or more subsequent polymerization reactors to maintain the hydrogen/ethylene partial pressure ratio at a targeted hydrogen/ethylene partial pressure ratio and adjusting the flow rates of the one or more comonomers to the one or more subsequent polymerization reactors to maintain the comonomer/ethylene partial pressure ratios at targeted comonomer/ethylene partial pressure ratios.

10. The method of claim 9, additionally comprising:
m) maintaining the flow rates of the diluent to the one or more subsequent polymerization reactors at a constant level.

11. The method of claim 9, wherein the series of polymerization reactors has two polymerization reactors.

12. The method of claim 9, wherein the series of polymerization reactors has three polymerization reactors.

13. The method of claim 9, wherein hydrogen is fed to a previous polymerization reactor; the slurry withdrawn from the previous polymerization reactor is subjected to a flashing step in a flashing vessel before being fed to the subsequent reactor; and the flow rate of hydrogen to the subsequent polymerization reactor is adjusted to maintain the hydrogen/ethylene partial pressure ratio at a targeted hydrogen/ethylene partial pressure ratio by adjusting the pressure in the flashing vessel.

14. A process for the preparation of polyethylene in a slurry polymerization by contacting, in a suspension medium comprising a diluent, ethylene, a Ziegler-type catalyst and either hydrogen or, as comonomer(s), one or more C3 to C10 alpha-olefins or hydrogen and one or more C3 to C10 alpha-olefins at a reactor temperature from 60° C. to 95° C. and a reactor pressure from 0.15 MPa to 3 MPa, wherein the polymerization is controlled by the method of claim 1.

15. The process of claim 14, wherein the polymerization is carried out in a series of polymerization reactors.

16. A method for controlling a slurry polymerization for the preparation of polyethylene which is carried out in a series of polymerization reactors having a first polymerization reactor and one or more subsequent polymerization reactors, where the polyethylene is formed in polymerization reactors comprising, as slurry, a suspension of particulate polyethylene in a suspension medium comprising a diluent by contacting a Ziegler-type catalyst, ethylene, and either hydrogen or, as comonomer(s), one or more C3 to C10 alpha-olefins or hydrogen and one or more C3 to C10 alpha-olefins at a reactor temperatures from 60° C. to 95° C. and a reactor pressures from 0.15 MPa to 3 MPa, where the Ziegler-type catalyst is fed to the first polymerization reactor and a diluent, ethylene, and either hydrogen or one or more C3 to C10 alpha-olefins or hydrogen and one or more C3 to C10 alpha-olefins are fed to each of the polymerization reactors and slurry is withdrawn from each of the polymerization reactor, and where the polymerization reactor each have a reactor slurry section comprising the slurry and a reactor vapor section comprising a vapor comprising ethylene, diluent, and either hydrogen or one or more C3 to C10 alpha-olefins or hydrogen and one or more C3 to C10 alpha-olefins, the method comprising:
a) withdrawing vapor from the reactor vapor section of the first polymerization reactor;
b) analyzing the vapor to determine its composition; and
c) calculating thereof, based on the pressure within the first polymerization reactor, values for the partial pressure of ethylene, for the partial pressure ratio of hydrogen to ethylene and for the partial pressure ratios of the one or more comonomers to ethylene;
d) maintaining the flow rate of the ethylene to the first polymerization reactor at a constant level;
e) adjusting the flow rate of the Ziegler-type catalyst to the first polymerization reactor to maintain the ethylene partial pressure at a targeted ethylene partial pressure;
f) either adjusting the flow rate of hydrogen to the first polymerization reactor to maintain the hydrogen/ethylene partial pressure ratio at a targeted hydrogen/ethylene partial pressure ratio;

or adjusting the flow rates of the one or more comonomers to the first polymerization reactor to maintain the comonomer/ethylene partial pressure ratios at targeted comonomer/ethylene partial pressure ratios;

or adjusting both the flow rate of hydrogen to the first polymerization reactor to maintain the hydrogen/ethylene partial pressure ratio at a targeted hydrogen/ethylene partial pressure ratio and adjusting the flow rates of the one or more comonomers to the first polymerization reactor to maintain the comonomer/ethylene partial pressure ratios at targeted comonomer/ethylene partial pressure ratios;

h) withdrawing vapor from the reactor vapor section of the one or more subsequent polymerization reactors,
i) analyzing the vapor to determine its composition; and
j) calculating thereof, based on the pressure within the subsequent polymerization reactor, values for the partial pressure of ethylene, for the partial pressure ratio of hydrogen to ethylene and for the partial pressure ratios of the one or more comonomers to ethylene;
k) maintaining the flow rate of the ethylene to the one or more subsequent polymerization reactors at a constant level; and
l) either adjusting the flow rate of hydrogen to the one or more subsequent polymerization reactors to maintain the hydrogen/ethylene partial pressure ratio at a targeted hydrogen/ethylene partial pressure ratio;

or adjusting the flow rates of the one or more comonomers to the one or more subsequent polymerization reactors to maintain the comonomer/ethylene partial pressure ratios at targeted comonomer/ethylene partial pressure ratios;

or adjusting both the flow rate of hydrogen to the one or more subsequent polymerization reactors to maintain the hydrogen/ethylene partial pressure ratio at a targeted hydrogen/ethylene partial pressure ratio and adjusting the flow rates of the one or more comonomers to the one or more subsequent polymerization reactors to maintain the comonomer/ethylene partial pressure ratios at targeted comonomer/ethylene partial pressure ratios.

17. The method of claim 16, additionally comprising:
a) maintaining the flow rate of the diluent to the polymerization reactor at a constant level.

18. The method of claim 17, additionally comprising:
a) maintaining the flow rates of the diluent to the one or more subsequent polymerization reactors at a constant level.

19. A process for the preparation of polyethylene in a slurry polymerization which is carried out in a series of polymerization reactors having a first polymerization reactor and one or more subsequent polymerization reactors, by contacting, in a suspension medium comprising a diluent, ethylene, a Ziegler-type catalyst and either hydrogen or, as comonomer(s), one or more C3 to C10 alpha-olefins or hydrogen and one or more C3 to C10 alpha-olefins at a reactor temperature from 60° C. to 95° C. and a reactor pressure from 0.15 MPa to 3 MPa, where the Ziegler-type catalyst is fed to the first polymerization reactor and a diluent, ethylene, and either hydrogen or one or more C3 to C10 alpha-olefins or hydrogen and one or more C3 to C10 alpha-olefins are fed to each of the polymerization reactors and slurry is withdrawn from each of the polymerization reactor, and where the polymerization reactor each have a reactor slurry section comprising the slurry and a reactor vapor section comprising a vapor comprising ethylene, diluent, and either hydrogen or one or more C3 to C10 alpha-olefins or hydrogen and one or more C3 to C10 alpha-olefins, wherein the polymerization is controlled by a method comprising:

a) withdrawing vapor from the reactor vapor section of the first polymerization reactor;
b) analyzing the vapor to determine its composition; and
c) calculating thereof, based on the pressure within the first polymerization reactor, values for the partial pressure of ethylene, for the partial pressure ratio of hydrogen to ethylene and for the partial pressure ratios of the one or more comonomers to ethylene;
d) maintaining the flow rate of the ethylene to the first polymerization reactor at a constant level;
e) adjusting the flow rate of the Ziegler-type catalyst to the first polymerization reactor to maintain the ethylene partial pressure at a targeted ethylene partial pressure;
f) either adjusting the flow rate of hydrogen to the first polymerization reactor to maintain the hydrogen/ethylene partial pressure ratio at a targeted hydrogen/ethylene partial pressure ratio;

or adjusting the flow rates of the one or more comonomers to the first polymerization reactor to maintain the comonomer/ethylene partial pressure ratios at targeted comonomer/ethylene partial pressure ratios;

or adjusting both the flow rate of hydrogen to the first polymerization reactor to maintain the hydrogen/ethylene partial pressure ratio at a targeted hydrogen/ethylene partial pressure ratio and adjusting the flow rates of the one or more comonomers to the first polymerization reactor to maintain the comonomer/ethylene partial pressure ratios at targeted comonomer/ethylene partial pressure ratios;

h) withdrawing vapor from the reactor vapor section of the one or more subsequent polymerization reactors,
i) analyzing the vapor to determine its composition; and
j) calculating thereof, based on the pressure within the subsequent polymerization reactor, values for the partial pressure of ethylene, for the partial pressure ratio of hydrogen to ethylene and for the partial pressure ratios of the one or more comonomers to ethylene;
k) maintaining the flow rate of the ethylene to the one or more subsequent polymerization reactors at a constant level; and
l) either adjusting the flow rate of hydrogen to the one or more subsequent polymerization reactors to maintain the hydrogen/ethylene partial pressure ratio at a targeted hydrogen/ethylene partial pressure ratio;

or adjusting the flow rates of the one or more comonomers to the one or more subsequent polymerization reactors to maintain the comonomer/ethylene partial pressure ratios at targeted comonomer/ethylene partial pressure ratios;

or adjusting both the flow rate of hydrogen to the one or more subsequent polymerization reactors to maintain the hydrogen/ethylene partial pressure ratio at a targeted hydrogen/ethylene partial pressure ratio and adjusting the flow rates of the one or more comonomers to the one or more subsequent polymerization reactors to maintain the comonomer/ethylene partial pressure ratios at targeted comonomer/ethylene partial pressure ratios.

20. The process of claim 19, wherein the series of polymerization reactors has three polymerization reactors.

* * * * *

UNITED STATES PATENT AND TRADEMARK OFFICE
CERTIFICATE OF CORRECTION

PATENT NO. : 9,790,303 B2
APPLICATION NO. : 15/321637
DATED : October 17, 2017
INVENTOR(S) : Reinhard Kuehl et al.

It is certified that error appears in the above-identified patent and that said Letters Patent is hereby corrected as shown below:

In the Specification

| Column 2 | Line 10 | Delete "3 MPa," and insert --3 MPa.-- |
| Column 2 | Line 34 | After "and", insert --¶f)-- |
| Column 5 | Line 34 | After "0.970 g/cm$^3$", insert --.-- |
| Column 6 | Line 33 | Delete "n-butyloxy ethoxy magnesium, n-butyloxy-sec-butyloxy magnesium," and insert --n-butyloxyethoxymagnesium, n-butyloxy-sec-butyloxymagnesium,-- |

In the Claims

| Column 16 | Line 40 | In Claim 9, delete "C3 to C10" and insert --$C_3$ to $C_{10}$-- |
| Column 16 | Line 41 | In Claim 9, delete "C3 to C10" and insert --$C_3$ to $C_{10}$-- |
| Column 17 | Line 38 | In Claim 14, delete "C3 to C10" and insert --$C_3$ to $C_{10}$-- |
| Column 17 | Line 38 | In Claim 14, delete "C3 to C10" and insert --$C_3$ to $C_{10}$-- |
| Column 17 | Line 52 | In Claim 16, delete "C3 to C10" and insert --$C_3$ to $C_{10}$-- |
| Column 17 | Line 53 | In Claim 16, delete "C3 to C10" and insert --$C_3$ to $C_{10}$-- |
| Column 17 | Line 58 | In Claim 16, delete "C3 to C10" and insert --$C_3$ to $C_{10}$-- |
| Column 17 | Line 59 | In Claim 16, delete "C3 to C10" and insert --$C_3$ to $C_{10}$-- |
| Column 17 | Line 65 | In Claim 16, delete "C3 to C10" and insert --$C_3$ to $C_{10}$-- |
| Column 17 | Line 66 | In Claim 16, delete "C3 to C10" and insert --$C_3$ to $C_{10}$-- |
| Column 18 | Line 32 | In Claim 16, delete "h)" and insert --g)-- |
| Column 18 | Line 34 | In Claim 16, delete "i)" and insert --h)-- |
| Column 18 | Line 35 | In Claim 16, delete "j)" and insert --i)-- |
| Column 18 | Line 40 | In Claim 16, delete "k)" and insert --j)-- |
| Column 18 | Line 43 | In Claim 16, delete "l)" and insert --k)-- |
| Column 19 | Line 7 | In Claim 19, delete "C3 to C10" and insert --$C_3$ to $C_{10}$-- |
| Column 19 | Line 8 | In Claim 19, delete "C3 to C10" and insert --$C_3$ to $C_{10}$-- |
| Column 19 | Line 13 | In Claim 19, delete "C3 to C10" and insert --$C_3$ to $C_{10}$-- |

Signed and Sealed this
Twenty-eighth Day of April, 2020

Andrei Iancu
*Director of the United States Patent and Trademark Office*

CERTIFICATE OF CORRECTION (continued)
U.S. Pat. No. 9,790,303 B2

| | | |
|---|---|---|
| Column 19 | Line 14 | In Claim 19, delete "C3 to C10" and insert --$C_3$ to $C_{10}$-- |
| Column 19 | Line 20 | In Claim 19, delete "C3 to C10" and insert --$C_3$ to $C_{10}$-- |
| Column 19 | Line 21 | In Claim 19, delete "C3 to C10" and insert --$C_3$ to $C_{10}$-- |
| Column 20 | Line 11 | In Claim 19, delete "h)" and insert --g)-- |
| Column 20 | Line 13 | In Claim 19, delete "i)" and insert --h)-- |
| Column 20 | Line 14 | In Claim 19, delete "j)" and insert --i)-- |
| Column 20 | Line 19 | In Claim 19, delete "k)" and insert --j)-- |
| Column 20 | Line 22 | In Claim 19, delete "l)" and insert --k)-- |